No. 630,567. Patented Aug. 8, 1899.
H. B. SAWYER & R. ROBB.
ELECTRICALLY DRIVEN SPINDLE.
(Application filed Apr. 14, 1898.)
(No Model.) 2 Sheets—Sheet 2.
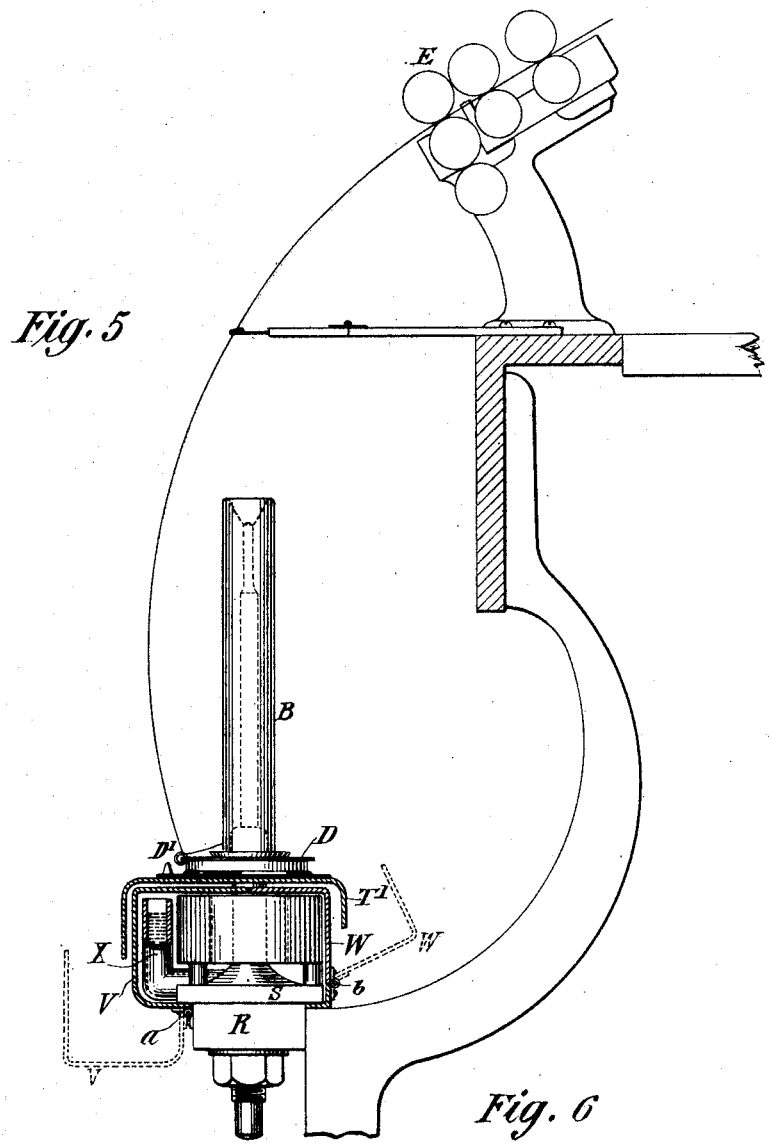
Fig. 5
Fig. 6
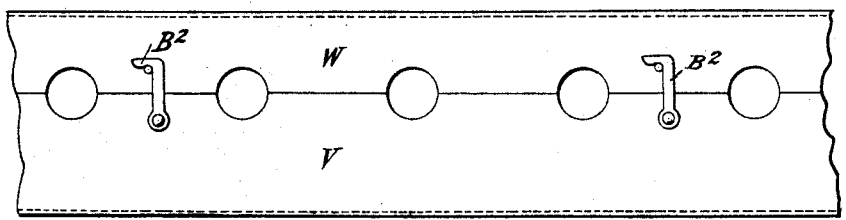
Witnesses: Inventors
Raphael Netter Henry B Sawyer
L. T. Shaw Russin Robb
by Edward M. Bentley, Att'y

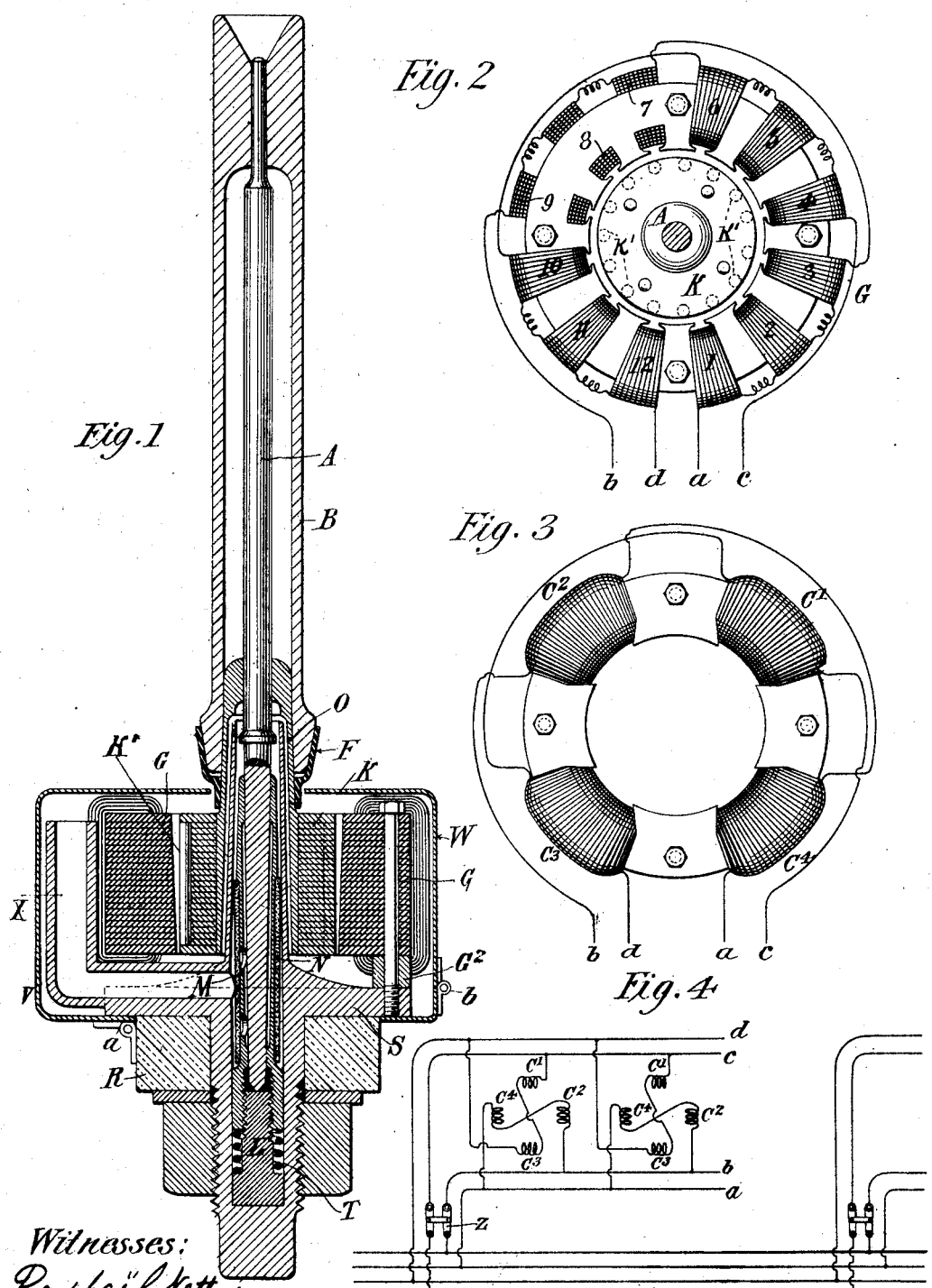

UNITED STATES PATENT OFFICE.

HENRY B. SAWYER, OF NEWTON, AND RUSSELL ROBB, OF CONCORD, MASSACHUSETTS.

ELECTRICALLY-DRIVEN SPINDLE.

SPECIFICATION forming part of Letters Patent No. 630,567, dated August 8, 1899.

Application filed April 14, 1898. Serial No. 677,546. (No model.)

*To all whom it may concern:*

Be it known that we, HENRY B. SAWYER, residing at Newton, and RUSSELL ROBB, residing at Concord, in the county of Middlesex, State of Massachusetts, citizens of the United States, have invented certain new and useful Improvements in Electrically-Driven Spindles, of which the following is a specification, reference being made to the accompanying drawings.

Our invention relates to electrically-driven spindles; and it consists in the production of a form of alternating-current motor of the induction type so constructed as to have the necessary strength and capacity for driving an individual spindle and the efficiency necessary to insure its economical operation, while, furthermore, the invention also comprises certain arrangements in the application of the motor to the spindle whereby the spindle when relieved from the band-pull heretofore present in the usual method of operation will remain properly balanced, so as to operate at the desired high speed, and will also have its speed automatically adjusted, according to the diameter of the bobbin and the strength of the thread with relation to the strain upon it.

Finally, the invention comprises certain details of construction by which the motor is suitably protected and guarded.

In the operation of spindles it is necessary that all those upon one frame shall operate at substantially a uniform speed with respect to each other, and while such speed has heretofore been practically constant our invention provides, as will be hereinafter explained, for a slight automatic change in the speed as the diameter of the wound bobbin increases. For securing this uniformity of speed we apply to each of the separate spindles a small alternating-current motor of the induction type whose speed is determined principally by the rate of alternation in the delivery of current, but which in our construction is also affected by the character that we give to the motor itself. A motor suitable for driving a spindle is necessarily a very small one, its full size being shown in the accompanying drawings, and heretofore no motor has been constructed which within the permissible dimensions has either the capacity or the efficiency to render its use with a spindle possible. To overcome this difficulty, we have constructed a motor of the described type having a cylindrical armature or rotating element surrounding the base of the spindle just above the supporting-rail and adjacent to the spindle-bearings. This element is composed of thin plates or laminations, and preferably has a series of conducting-rods embedded in its surface and forming a closed circuit, in which, in the usual way, there is induced by the field-magnet a magnetizing-current. This part of the motor, whether it be regarded as an armature or as a field-magnet, will be designated as the "rotor" to distinguish it from the stationary element, which will be designated as the "stator." The latter element consists of a laminated ring surrounding the rotor and presenting a series of inwardly-projecting pole-pieces, between which are wound the energizing-coils in planes radial to the center of rotation. The rotor will be separated from the stator by a space greater than would ordinarily be provided in a motor of this size and description in order to permit of the gyratory movement of the spindle and its attached rotor in the bearings provided therefor. This space, moreover, between rotor and stator is preferably greater at the upper side than the lower side, one of the elements having a conically-formed surface with the greater diameter uppermost to accommodate the greater range of gyratory movement of those portions more distant from the step-bearing, which is the center of gyration. This construction permits the spindle and the rotor to run free at the highest speed, while the location of the comparatively heavy cylindrical rotor at a point adjacent to the step-bearing, which upholds the spindle and rotor from below, affords a perfect balance for the spindle when relieved from the band-pull present in the present method of spindle-driving and reduces the side friction on the bolster-bearing to a minimum. A further advantage of this arrangement is that while a complete electric motor, including both a stationary and a rotating member, has been added to the spindle it is the rotating member only that partakes of the gyratory movement. Thus the minimum weight of material is gyrated with the minimum gyratory inertia, and, moreover, such movement is not transmitted through running bearings, as would be the case if the stator and rotor were both flexibly mounted so as to gyrate together, an arrangement which would be required if the ordinary fixed alinement of rotor and stator and the restricted air-gap between them were preserved. Moreover, in a ring-spinning frame the amount of twist in the yarn, and consequently to a certain extent the strength of the yarn, is less when the diameter of the bobbin is small, while at the same time the tension imposed by the traveler is greater because the pull of the yarn on the traveler when the bobbin is small is more nearly in a radial and less in a tangential direction than when the diameter of the bobbin is larger. Consequently it is desirable that the speed of the spindle with relation to the speed of the feed-rolls should be greater when the diameter of the bobbin is small than when it is large. Heretofore it has been customary to provide for this by increasing the speed of the feed-roll as the diameter of the bobbin increases, while leaving the spindle speed unchanged. This has reduced to some extent the possible speed of operation and output of the frame, since the speed of the front roll, which delivers the yarn, must be less at first than the normal and only attains its maximum when the bobbin is full. We, on the contrary, provide a constant maximum speed for the delivery-rolls and so construct our operating-motors that the slip of the rotor or its variation from the normal speed of polar rotation in the stator shall increase with the increase in the diameter of the wound bobbin. In this way the spindle speed will decrease slightly as the bobbin fills up, and the twist of the yarn and its strength can be always nearly proportional to the tension of the traveler thereon. This adjustment will not only be automatic, but will be always adapted to the requirements of each spindle, whereas in prior methods it has only been possible to effect an adjustment for all the spindles of any one frame as a whole without regard to the condition of individual spindles. We also provide for a series of spindles two guard-plates upon the opposite sides thereof, respectively, which completely cover over and inclose the motors, leaving only a series of small openings through which the spindles can pass. This fully protects the motors from lint, dirt, and oil and at the same time acts as a doffing-guard to prevent the lifting of the spindle and rotor as the bobbins are removed.

Referring to the accompanying drawings, Figure 1 is a vertical diametrical section of a spindle with its operating-motor and bearings. Fig. 2 is a plan of the motor, partly in section. Fig. 3 shows a possible modification of the stator. Fig. 4 shows the connections for two or more motors on a single frame. Figs. 5 and 6 illustrate the arrangement of the guard-plates.

In the drawings, A represents a spindle, which carries a bobbin B.

R is a supporting-rail of a spinning-frame, upon which is seated a standard S, in which are contained the bearings for the spindles. These spindles and bearings may be constructed on any of the present well-known methods. Those shown herein consist, first, of a step-bearing L, which receives on its upper surface the lower extremity of the spindle A, and, second, of a tubular bolster-bearing M within the standard and surrounding the lower part of the spindle, preferably separated from the standard by a surrounding layer of felt N or other yielding material which will permit of a slight movement of the bearing with relation to the standard. The step-bearing L is adjustable vertically with relation to the bolster-bearing, and the degree of pressure of the spindle on the bolster-bearing may be adjusted by raising or lowering the step-bearing by screwing it into or out of the opening in the lower end of the tubular bolster, the screw connection being somewhat loose, so as not to interfere with the oscillation of the spindle and bolster. This adjustment may be automatically determined in a well-known manner, not requiring detailed explanation, by means of a spring T, adjusted to yield at a given degree of friction, and thus vary the relation of the step-bearing to the bolster. With this arrangement it will be obvious that the spindle when rotating at high speed will have a slight gyratory movement centered on the lower extremity of the spindle resting on the step-bearing. The standard aforesaid extends through the rail R and is seated thereon, being held in position by a nut on the under side, while an oil-duct X is extended through the standard from an outside point and delivers oil to the interior of the bolster-bearing by suitable openings therein, whence it works down to the step-bearing. Above the upper edge of the tubular standard there is attached to the spindle a conical sleeve O, extending downward around the standard, but free therefrom, and carrying a cup F, if desired, for receiving the lower end of bobbin B. To this sleeve, at a point above the rail R and yet as close as feasible to the step-bearing L, which is the gyratory center of the spindle, we attach the rotor K of an electric motor, consisting of a series of plates or laminations, making up a cylindrical body of soft iron having considerable weight with relation to the weight of the spindle itself and the bobbin carried thereby. This will bring the center of gravity of the rotating parts as close as possible to the step-bearing, although still being above that bearing, and in consequence the balance of the rotating parts will be maintained and the friction between the bolster-bearing and the spindle will be reduced to the minimum. Around the periphery of the motor and parallel with the axis thereof are arranged a series of conducting-rods K', embedded in the laminations and connected at top and bottom by disks concentric with and of the same diameter as the rotor itself. These conductors form a closed circuit, in which an energizing-current will be induced by the action of the stator. The latter, G, is made in the form of a ring completely surrounding the rotor, but separated therefrom by a space somewhat greater than would be ordinarily provided for a motor of this size in order to permit of the gyratory movement of the spindle and rotor. The stator is preferably supported on the standard S, which carries the spindle-bearings, by intervening blocks $G^2$, of non-magnetic material, which prevent short-circuiting of the magnetism. The attachment of the stator to the spindle-base instead of the rail or other part of the frame allows of a more accurate adjustment of the parts and permits of the attachment of a completed and properly-adjusted spindle combined with its motor to any existing form of frame without special adaptation. The stator is provided with a series of inwardly-projecting pole-pieces, and between these pole-pieces the coils are wound in planes radial to the center of the spindle. This arrangement permits of utilization of the available space for iron and wire, except such as is necessarily utilized for the gyratory movement, and such complete utilization is necessary in order to overcome the disadvantage presented by the unusual air-gap between stator and rotor if the motor is to have a capacity and efficiency such as is necessary for practical economical operation. As appears in Fig. 1, this air-gap is greater at the upper side of the armature than at the lower side, the difference being exaggerated somewhat in the figure. This is due to the fact that the center of gyration being the lower extremity of the spindle the extent to which the spindle and rotor will deviate from the normal central position is greater as the radial distance from such center increases. Therefore in order to accurately accommodate the gyratory movement the air-gap must be greater in proportion to the radial distance from the lower extremity of the spindle.

The arrangement of the coils and pole-pieces in the stator is illustrated in detail in Fig. 2, which will be understood from the explanation already given. In this figure the connection of the stator-coils is also illustrated, the motor being shown as provided with four sets of coils, each set containing three individual coils and being connected in pairs in the usual manner to the two respective branches of a two-phase alternating-current circuit. Thus coils 1, 2, and 3 make up one set, which is connected in series with the opposite set composed of coils 7, 8 and 9 between the wires $a\,b$ on one side of the circuit, and the set composed of the coils 4, 5, and 6 is connected in series with the set composed of the coils 10, 11, and 12 between the wires $c\,d$ of the other side of the circuit. It is also possible to employ four pole-pieces instead of twelve by arranging the coils as shown in Fig. 3. In this figure the opposite coils do not consist of sets comprising a number of individual sections, but are complete in themselves, there being four coils $C'$, $C^2$, $C^3$, and $C^4$. Two of these coils, $C^2$ and $C^4$, are connected between lines $a\,b$, and the other two, $C'$ and $C^3$, are connected between the lines $c$ and $d$.

In Fig. 4 a diagram of the circuits is shown. It appears in this figure that for each frame there will be provided a common set of conductors $a\,b$ and $c\,d$, whose connection with the main line is controlled by a switch Z, and the individual motors for the respective spindles will be all connected in parallel to the conductors pertaining to the frames on which the spindles are located. The coils of two such motors are indicated in Fig. 4 as connected between the conductors $a\,b$ and $c\,d$ in the manner already described.

Turning next to Fig. 5, E represents the delivery-rolls, from which the yarn C passes first to the traveler D on a ring D', carried by the ring-rail T', (shown in the figure as in its lowest position,) and thence to the bobbin B, whereon it is wound and also twisted by the rotation of the spindle. It will be apparent that when the bobbin is empty, as shown, or nearly so, the tension imposed by the traveler is greater than it is when the bobbin is fully wound, or nearly so, since the thread draws the traveler around the ring by pulling thereon in a direction which is more nearly a radial direction when the bobbin is small and becomes more nearly a tangential direction when the bobbin is large. The greater tension thus imposed by the traveler requires a somewhat stronger thread, which may be had by giving it a greater number of twists per inch. Heretofore the feed-rolls E have sometimes been arranged to deliver yarn at a somewhat greater speed as the diameter of the bobbin is increased, leaving the spindle speed constant, and thereby giving to the thread a less number of twists per inch delivered, or, to state it reversely, delivering more inches of yarn for a given number of twists. This has reduced somewhat the output of a spinning-frame, as the rolls deliver at the maximum rate only when the bobbins are full.

By our invention we provide a constant maximum speed of the delivery-rolls E and provide for a somewhat greater spindle speed when the bobbin is small, so as to give at that time the additional number of twists per inch of the thread, and, moreover, we provide that this speed shall be automatically adjusted, not only for the spindles of any one frame as a whole, but also for the individual spindles themselves. This is accomplished by constructing the motor so that the slip between rotor and stator shall give a definite decrease in speed as the spindle becomes loaded, this decrease being in the ratio of the desired decrease in the number of twists per inch of thread which it is desired to secure, or, to state it conversely, the greater speed when the bobbin is small is in the ratio of the desired greater number of twists which it is desired to give to the thread at that time.

It is to be understood that we do not limit ourselves to any particular form of induction-motor or to any particular form and arrangement of the spindle and its bearings, since we believe ourselves to be the first ones to combine a front roll of a spinning-frame and a spindle receiving thread therefrom with an electric motor for driving the spindle, which is of the induction type, wherein the speed is not dependent entirely upon the rate of alternations in the supply-circuit.

The remaining feature of our invention is particularly illustrated in Figs. 1, 5, and 6. Underneath the ring-rail and above the motor are placed the guard-plates V and W, the former being U-shaped in cross-section and hinged to the frame of the machine at $a$ and the latter being an angle-strip hinged to the frame at $b$. These guard-plates, as shown in Fig. 6, are of a length sufficient to cover two or more spindles, and when turned back on their hinges $a$ and $b$ they take the position shown in the dotted lines of Fig. 5. The adjacent edges of these plates are provided with semicircular notches at intervals, as shown in Fig. 6, which register and form circular openings, through which the spindles pass, and with catches $B^2$ for holding them in place. It is convenient to have a single pair of guide-plates include seven or eight spindles, but this number may be increased or diminished without departing from the principle of a common guard for a plurality of spindles. The guard-plate V is enlarged and differently shaped, as compared with the guard W, for the purpose of inclosing therein the oil-tube X, through which the motor and spindle-bearings are lubricated. These guards serve to entirely close in the motor with its bearings and lubricating devices, so as to protect them against lint, dust, and any external interference, while it serves particularly as a step for holding the spindle and rotor in place when the bobbin is "doffed."

It should be added that the above-described arrangement for the graduation automatically of the motor and spindle speed to a degree commensurate with the decrease of twist necessary is of particular advantage in connection with the provision of individual driving mechanism for the respective spindles. Since the winding of all the bobbins may not begin at the same instant and may not be carried on at exactly the same rate in each case, by reason of stoppages or other incidents at particular spindles, it becomes important, in connection with the constant speed provided by the front roll of all the spindles, to have the adjustment or graduation above referred to take place at each spindle independently of the others. Hence the individual capacity of the respective spindle for adjustment in speed is an advantage additional to the general advantage residing in the adjustment itself.

In the practical use of our invention we have found that the introduction of the described electric motor involves an adjustment of the spindle and its attached rotor with relation to the stator additional to the adjustment heretofore required of the spindle with relation to the feed-roll and other parts of the machine. We have also found it desirable to have these two adjustments independent of each other, so that the former can be made permanent and be undisturbed by any changes made in the latter. Therefore we have provided a rigid standard, which, on the one hand, is provided with means for attaching it to the frame of the machine and, on the other hand, is firmly connected to the stator, and is also made to support the bearings for the spindle and its attached rotor, so that it may serve to maintain permanently such adjustment as may be made of the spindle and rotor with relation to the stator. We thus provide as a completed article of manufacture a combined motor and spindle whose parts may be put into the necessary condition of adjustment with relation to one another and so maintained, while the device as a whole can be applied to the frame of the spinning-machine without any disturbance of the prearranged adjustment.

What we claim as new, and desire to secure by Letters Patent, is—

1. The combination with a spindle having a flexible bearing, giving it a capacity for gyratory movement, of an induction-motor rotor attached thereto and a stator attached to a stationary part of the machine, but separated from the rotor by an air-gap sufficient to permit the gyratory movement of the spindle and attached rotor without contact between stator and rotor.

2. The combination with a spindle, of an induction-motor rotor attached thereto, a yielding bearing adjusted to support both spindle and rotor so as to permit of their joint gyration, and a stator attached to a stationary part of the machine and separated from the rotor by an air-gap that permits the aforesaid gyration of spindle and rotor.

3. The combination with a spindle, of a depending sleeve outside of the bearing-tube and separated therefrom, a rotor-core surrounding and attached to said sleeve, conductors on said core forming a closed circuit, an annular stator surrounding said rotor, but separated therefrom by an air-gap that permits its gyration, and distinct windings on said stator for receiving alternating currents of differing phase.

4. The combination with a spindle of flexible bearings therefor, an induction-motor rotor attached thereto, and an annular stator surrounding and presenting a series of polar projections to the said rotor which are separated from the rotor sufficiently to permit thereto a gyratory motion, the said stator being wound at the spaces between succeeding polar projections with wire lying in radial planes.

5. The combination with a spindle of flexible bearings therefor, an induction-motor rotor attached thereto, an annular stator wound with wire lying in radial planes and surrounding the rotor, to which it presents a series of pole-pieces separated therefrom by a space permitting a gyratory motion thereto, and non-magnetic material intervening between the core of said stator and the magnetic frame of the machine.

6. The combination with a spindle having a supporting-bearing at its lower end, of an electric motor surrounding the said spindle and concentric therewith at a point above and adjacent to the said bearing, and a side bearing for the said spindle permitting a gyratory movement thereof, said motor being provided with a cylindrical balanced rotor and with a stator surrounding the rotor but separated therefrom by a space greater than the gyratory deviation of the rotor from its normal central position.

7. The combination with a spindle having bearings permitting a gyratory movement of the spindle, of an electromagnetic rotor attached to the spindle and capable of gyrating therewith, and a stator surrounding the rotor, but separated therefrom by an air-gap increasing in extent with the increase of the radial distance from the center of gyration.

8. In a spinning-machine, the combination with a feed-roll, of a spindle receiving thread therefrom and a driving-motor for the spindle of the alternating-current type, wherein the motor speed differs from the speed of polar rotation in the inducing member which corresponds to the frequency of the alternations in the supply-circuit.

9. In a spinning-machine, the combination with a front roll of a spindle and an alternating-current electric motor of the induction type connected to the spindle for driving the same and constructed to have, as it becomes loaded, a slip substantially commensurate with the decrease of twist necessary to the yarn.

10. In a spinning-frame, the combination with a front roll of a series of spindles and a corresponding series of alternating-current electric motors of the induction type connected respectively to the said spindles for operating the same and constructed each so as to have, as it becomes loaded, a slip substantially commensurate with the decrease of twist necessary to the yarn running to the bobbin on its individual spindle.

11. In a spinning-machine the combination with a spindle, of an electric-motor rotor attached thereto, a removable guard extending over said rotor but out of contact therewith, a stator surrounding said rotor but attached to the frame of the machine, and bearings supporting said rotor and spindle from below and from which the rotor is vertically removable independently of the stator.

12. In a spinning-machine, the combination with a spindle, of an operating electric motor therefor consisting of a rotor and stator, the latter being attached to the frame of the machine, and two angular guard-plates hinged to the frame of the machine on opposite sides of the motor with their meeting edges notched to receive the spindle and forming a complete inclosure for the motor, and serving also as a guard to prevent the removal of the rotor from its bearing.

13. In a spinning-machine, the combination with a spindle, of an operating-motor therefor, consisting of a rotor and stator, the latter being attached to the frame of the machine, an adjacent oil-tube for lubricating the spindle-bearings and a hinged guard-plate inclosing both the motor and the oil-tube, and formed with a projection above the rotor to serve as a guard against the removal of the same from its bearings.

14. In a spinning-machine the combination with a series of spindles, of individual electric motors for operating the same, each consisting of a rotor and stator, the stators being attached to the frame of the machine, and the rotors being provided with bearings supporting them from below and from which the rotors are removable, and a guard extending along two or more spindles and projecting over the motor-rotors of the said spindles to prevent the removal of the said rotors from their bearings.

15. As a new article of manufacture, a combined spindle and motor comprising a rigid standard, attachments for connecting it to the frame of the spinning-machine, a spindle flexibly mounted on said standard, a stator also mounted on said standard and a rotor within the stator attached to the spindle, the parts being permanently adjusted with relation to one another and the device as a whole being adapted for application to a spinning-machine without disturbance of the said adjustments.

In witness whereof we have hereunto set our hands, before two subscribing witnesses, this 11th day of April, 1898.

HENRY B. SAWYER.
RUSSELL ROBB.

Witnesses:
CHAS. F. WALLACE,
HOWARD L. ROGER.